(12) United States Patent
Honma et al.

(10) Patent No.: US 7,366,392 B2
(45) Date of Patent: Apr. 29, 2008

(54) LIGHTING DEVICE AND DISPLAY DEVICE USING THE SAME

(75) Inventors: Katsunori Honma, Chiba (JP); Norihiro Dejima, Chiba (JP); Makoto Kurihara, Chiba (JP); Takayasu Sado, Chiba (JP)

(73) Assignee: Seiko Instruments Inc. (JP)

( * ) Notice: Subject to any disclaimer, the term of this patent is extended or adjusted under 35 U.S.C. 154(b) by 28 days.

(21) Appl. No.: 11/126,634

(22) Filed: May 11, 2005

(65) Prior Publication Data

US 2005/0286854 A1    Dec. 29, 2005

(30) Foreign Application Priority Data

May 20, 2004   (JP)   .............................. 2004-150796
Apr. 15, 2005   (JP)   .............................. 2005-118224

(51) Int. Cl.
*G02B 6/00* (2006.01)
(52) U.S. Cl. ................................... 385/146
(58) Field of Classification Search .................... None
See application file for complete search history.

(56) References Cited

U.S. PATENT DOCUMENTS 6,671,013 B1 * 12/2003 Ohkawa ...................... 349/62
7,056,005 B2 * 6/2006 Lee ............................. 362/625
2002/0044436 A1 * 4/2002 Ohkawa ....................... 362/31
2002/0163790 A1 * 11/2002 Yamashita et al. ........... 362/31
2003/0137824 A1 * 7/2003 Shinohara et al. ........... 362/31
2004/0047161 A1 * 3/2004 Mochizuki et al. .......... 362/511

FOREIGN PATENT DOCUMENTS

JP      2003-121656 A  *  4/2003

* cited by examiner

*Primary Examiner*—Rodney Bovernick
*Assistant Examiner*—Mike Stahl
(74) *Attorney, Agent, or Firm*—Adams & Wilks (57) ABSTRACT

A lighting device comprises a light guide plate having a light incident surface and a light exit surface, at least one point light source for emitting light that is incident on the light incident surface of the light guide plate and is guided by the light guide plate to the light exit surface of the light guide plate, and micro-structures disposed on a surface of the light guide plate that is opposite to the light exit surface thereof for scattering light from the point light source that is incident on the light incident surface. A longitudinal direction of each of the micro-structures is substantially aligned with a direction in which the light from the point light source is incident on each of the micro-structures. Each of the micro-structures has an inclined surface for reflecting the incident light toward the light exit surface of the light guide plate. A base line of the inclined surface of each micro-structure is disposed substantially orthogonal with the direction in which the light from the point light source is incident on each of the micro-structures.

20 Claims, 6 Drawing Sheets

LIGHTING DEVICE AND DISPLAY DEVICE USING THE SAME

BACKGROUND OF THE INVENTION

1. Field of the Invention

The present invention relates to a lighting device used for a computer device, a mobile telephone, or a general electronic device and a display device using the lighting device.

2. Description of the Related Art

In recent years, there is increasingly growing concern about a thin type, light weight, a high intensity, and low power consumption in a color liquid crystal display device used for a computer device, a mobile telephone, or the like. With this concern, a high intensity LED having high light emission efficiency has been used as a light source for the lighting device of the color liquid crystal display device in many cases. A light guide plate for confining light from the light source and irradiating the liquid crystal display device with the confined light has been actively designed in view of a point light source such as an LED. More specifically, there have been disclosed the following technique and structure (for example, see JP 3151830 B). In the technique, light output efficiency is improved by arranging diffusion pattern elements which are formed on the lower surface of a light guide plate and have an orientation in a longitudinal direction, such that the longitudinal direction becomes substantially perpendicular to a direction joining the diffusion pattern element with the light source. In the structure, an oblique portion is provided in a ½ region of the light guide plate so as to prevent an affect of a diffusion pattern element density on an intensity characteristic from saturating.

In the above-mentioned conventional lighting device, the longitudinal direction of the diffusion pattern element is substantially perpendicular to the direction joining the diffusion pattern element with the light source. Therefore, there is a problem in that an arrangement density of the diffusion pattern elements to an arc direction about the diffusion pattern element cannot be sufficiently secured and thus the pattern arrangement becomes difficult. In addition, when the oblique portion is provided in substantially ½ region of the light guide plate, a reflection angle of light multi-reflected in an inner part of the oblique portion is changed with transmission of the light. Therefore, the diffusion pattern element is hard to design.

SUMMARY OF THE INVENTION

Therefore, an object of the present invention is to provide a lighting device in which a point light source such as an LED is used and its structure is optimized to realize a thin type, light weight, and high intensity lighting device.

According to the lighting device of the present invention, a point light source is located close to a light incident surface of a light guide plate and micro-structures for light-scattering are formed separate from each other on a surface opposed to a light exit surface of the light guide plate over the substantial entire surface. A shape of the micro-structure for light-scattering has an orientation in a longitudinal direction. The longitudinal direction is substantially parallel to a direction joining the micro-structure for light-scattering with a point light source of the plurality of point light sources which is closest thereto. Therefore, an arrangement density of diffusion pattern elements in an arc direction about the point light source can be sufficiently secured without a reduction in light output efficiency of light from the point light source.

A side surface of the micro-structure for light-scattering is substantially parallel to the direction joining the micro-structure for light-scattering with the point light source of the plurality of point light sources which is closest thereto. Therefore, light reflection efficiency of the micro-structure for light-scattering can be improved as compared with a conventional micro-structure for light-scattering having a triangular prism shape, a semi-cylinder shape, or the like.

The light exit surface of the light guide plate or the surface opposed thereto is divided into a plurality of regions in substantially parallel with the light incident surface of the light guide plate. A thickness of the light guide plate in the plurality of regions reduces with an increase in distance from the plurality of point light sources. Therefore, when the light guide plate in a region located at a distance from the point light source is thinned, use efficiency of the micro-structure for light-scattering can be improved and a reflection angle of light traveling through the inner portion of the light guide plate can be held unchanged. Thus, the micro-structure for light-scattering is easy to design.

A shape of a boundary surface between the plurality of regions formed in the light guide plate is set to arcs about the plurality of point light sources. Therefore, light reflected on the boundary surface is efficiently reflected again on the micro-structure for light-scattering, so that a bright lighting device can be realized.

In the inner portion of the light guide plate, a power density of traveling light reduces with an increase in distance from the point light source. Therefore, in order to allow uniform illumination, the forming density of the micro-structures for light-scattering is increased with an increase in distance from the point light source.

In particular, when the light guide plate is divided into a plurality of regions having different thicknesses, an optical power density of the inner portion of the light guide plate discontinuously changes with a change in thickness of the light guide plate. An optical power density of traveling light in each of the regions becomes smaller with an increase in distance from the point light source. Therefore, the micro-structures for light-scattering are formed such that a forming density thereof in inner portions of the plurality of regions formed in the light guide plate becomes larger with an increase in distance from the point light source. Here, the forming density of the micro-structures for light-scattering discontinuously changes through the boundary surface. Thus, uniform illumination is allowed.

When light from the light incident surface near which the point light source is located is efficiently used, the cross section of the micro-structure for light-scattering in a direction joining the micro-structure for light-scattering with a point light source of the plurality of point light sources which is closest thereto is set to substantially a right triangle. Therefore, light use efficiency can be improved.

In contrast to this, when reflection light on an end surface of the light guide plate opposed to the light incident surface near which the point light source is located is used, the cross section of the micro-structure for light-scattering in the direction joining the micro-structure for light-scattering with the point light source of the plurality of point light sources which is closest thereto is set to substantially an isosceles triangle. Therefore, light use efficiency can be improved.

When the micro-structures for light-scattering cannot be formed on the light guide plate at a sufficient density, second micro-structures for light-scattering are formed separate from one another on the light exit surface of the light guide plate over the substantial entire surface. A shape of the second micro-structure for light-scattering has an orientation in a longitudinal direction. The longitudinal direction becomes substantially parallel to or perpendicular to a direction joining the second micro-structure for light-scattering with a point light source of the plurality of point light sources which is closest thereto. Therefore, illumination light can be directly obtained from the light exit surface.

In this time, when the cross section of the second micro-structure for light-scattering in the direction joining the second micro-structure for light-scattering with the point light source is set to a right triangle or an isosceles triangle, it is possible to improve the light use efficiency. When a light diffusing sheet or a prism sheet is provided facing the light exit surface of the light guide plate, an illumination radiation distribution from the lighting device can be optimized, so that a bright lighting device can be realized. In order to reuse light leaked from the end surface of the light guide plate to improve the light use efficiency, the light reflecting layers are provided facing a surface opposed to a light irradiation surface of the light guide plate and side surfaces which is perpendicular to the light irradiation surface and other than the light incident surface.

The point light source, the light guide plate, the light diffusing sheet, and the light reflecting layers are held by a case in which the light irradiation surface side of the light guide plate is opened. Therefore, it is possible to realize a lighting device, which is easy to handle and has high stability and reliability.

When the lighting device having any one of the above-mentioned structures is combined with a non-self light emission display element, a display device which has a high intensity and is thin and light weight can be realized.

DETAILED DESCRIPTION OF THE EMBODIMENT

Figure 4A:
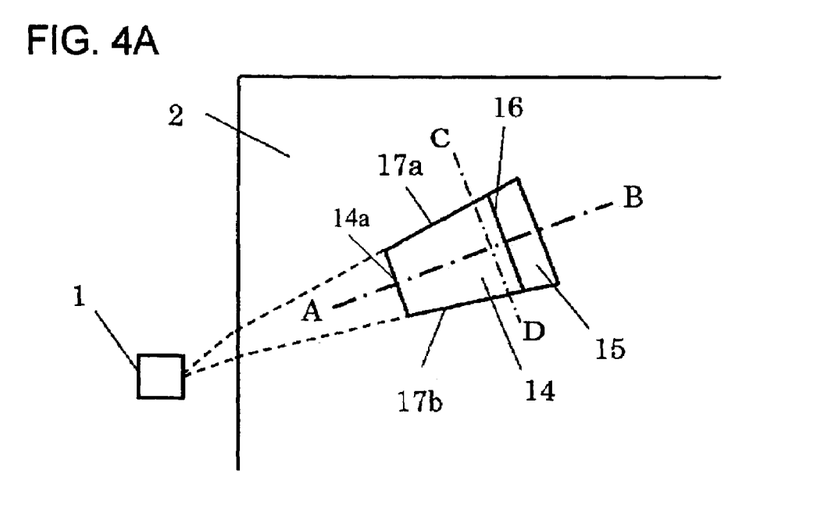
FIGS. 4A to 4C are schematic explanatory views showing a micro-structure for light-scattering formed in the light guide plate used in the embodiment of the present invention.
Figure 4B:
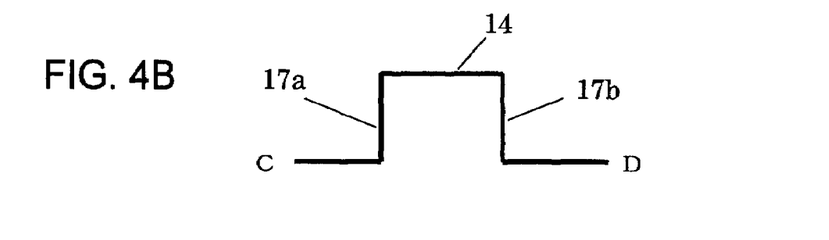
Figure 4C:
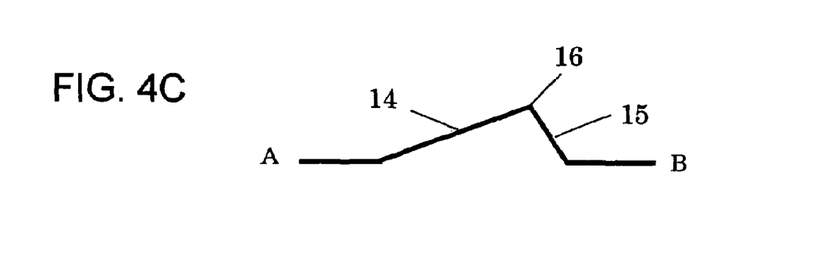
Figure 9:
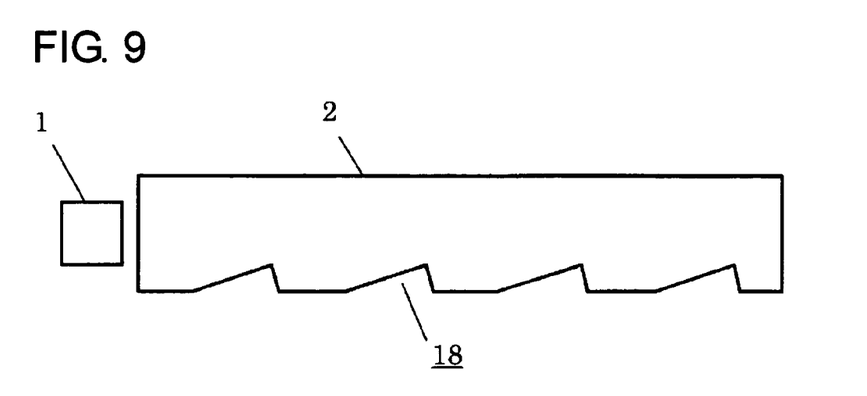
FIG. 9 is a schematic view showing a cross sectional shape of another light guide plate used for the lighting device according to the embodiment of the present invention.

A structure of a lighting device of the present invention will be described with reference to FIGS. 4A to 4C and 9. As schematically shown in FIG. 9, the lighting device of the present invention includes point light sources 1, a light guide plate 2, and a plurality of micro-structures for light-scattering 18. The light guide plate 2 has a light incident surface and a light exit surface and guides light from the point light sources 1 from the light incident surface to the light exit surface. The micro-structures for light-scattering 18 are formed on a surface opposed to the light exit surface of the light guide plate 2. As shown in FIG. 4, a longitudinal direction of the micro-structure for light-scattering 18 is substantially aligned with a direction in which a light beam from the point light source 1 is incident on the micro-structure for light-scattering 18. A line joining the micro-structure for light-scattering 18 with the point light source 1 may be substantially parallel to the longitudinal direction of the micro-structure for light-scattering 18. Two surfaces composing each of the micro-structures for light-scattering 18 are formed such that virtual planes produced by extending the respective side surfaces toward the point light source cross each other at the point light source. Each of the two surfaces composing each of the micro-structures for light-scattering 18 may be a light diffusing surface. Each of the two surfaces may be a wave-curved surface or a surface composed of a plurality of surfaces. Further, each of the two surfaces may be a light diffusing surface.

The light exit surface of the light guide plate or the surface opposed to the light exit surface is divided into a plurality of regions. A thickness of the light guide plate in the plurality of regions reduces with an increase in distance from the point light source. The plurality of regions are separated from one another so as to be substantially orthogonal to a straight line joining the micro-structure for light-scattering with the point light source. More specifically, a shape of each of boundary surfaces between the plurality of regions is set to an arc about the point light source as a substantially center. A forming density of the micro-structures for light-scattering discontinuously changes through each of the boundary surfaces.

When a plurality of point light sources are provided, the micro-structure for light-scattering is formed corresponding to each of the point light sources.

Hereinafter, the present invention will be specifically described with reference to the accompanying drawings.

Figure 1:
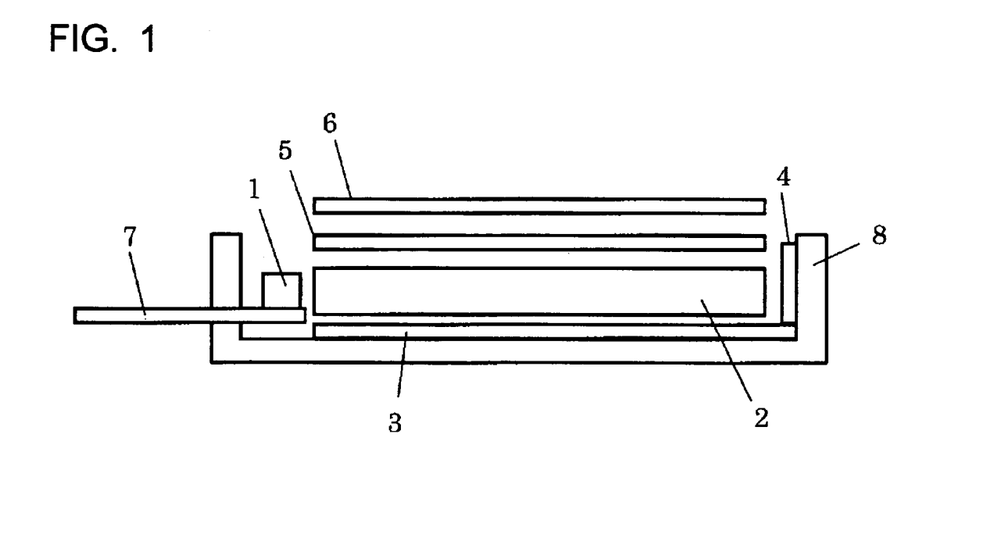
FIG. 1 is a schematic sectional view showing a lighting device according to an embodiment of the present invention.
Figure 2:
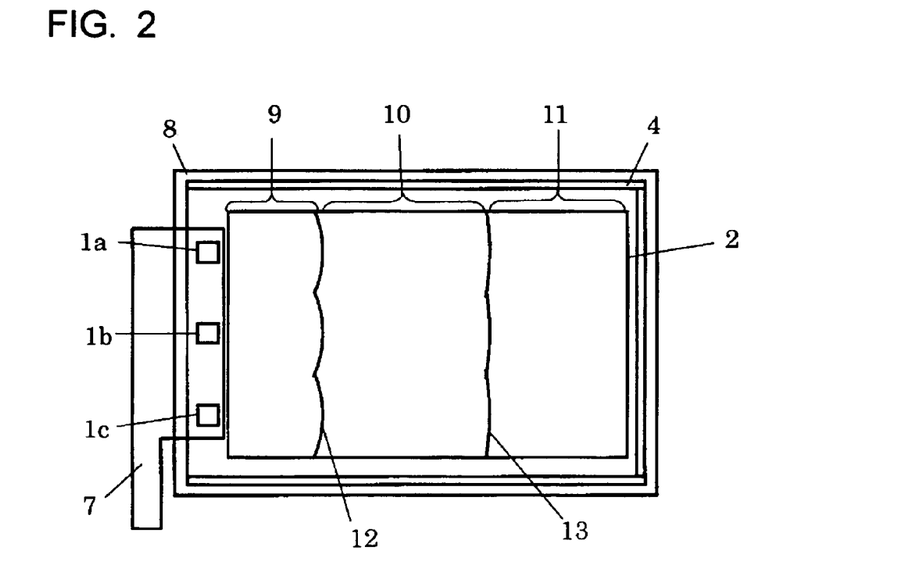
FIG. 2 is a schematic plan view showing the lighting device according to the embodiment of the present invention.

FIGS. 1 and 2 are a side sectional view and a plan view showing a fundamental structure of the light device according to this embodiment. As shown in FIG. 1, the point light sources 1 are provided facing the light incident surface of the light guide plate 2. A positional relationship between the light incident surface and the light exit surface is a vertical relationship. Here, an LED element is used as each of the point light sources 1. It has been well known that the LED element includes a white LED and a three-color mixed LED. In the case of the white LED, blue light emitted from a blue LED is subjected to wavelength conversion by a yellow phosphor to produce green light and red light. The blue light, the green light, and the red light are subjected to additive color mixing to obtain white light. In the case of the three-color mixed LED, a red LED for emitting red light, a green LED for emitting green light, and a blue LED for emitting blue light are located close to each other and additive color mixing is performed to obtain white light. Each of the LED elements has a light emitting region equal to a thickness of the light guide plate. A length of the light emission region is sufficiently shorter than a length of the light incident surface. Therefore, the LED element can be used as a point light source.

The point light sources 1 are arranged on an FPC board in which electrode wirings are formed on a polymer film made of polyimide or the like. Power is supplied from a power source (not shown) to the point light sources 1. In many cases, a plurality of point light sources are arranged. FIG. 2 shows an example in which three point light sources 1a, 1b, and 1c are arranged. When a lighting device is a side light type in which light is incident on a side surface of the light guide plate 2 as shown in FIG. 2 and has a small size as used for a mobile telephone or the like, the number of LEDs is generally two to five. When a lighting device is used for a liquid crystal display device having a size equal to or larger than a 15-inch size, such as a liquid crystal display device for a notebook type computer, 300 to 400 LEDs are used. The present invention can be also applied to a lighting device having consideration for an emission characteristic of each of a plurality of point light sources.

The light guide plate 2 is formed by injection molding using a transparent polymer material such as an acrylic resin, a polycarbonate resin, or a cycloolefin resin. The plurality of micro-structures for light-scattering are formed on a surface opposed to the light exit surface of the light guide plate 2, that is, a rear surface thereof. Light emitted from each of the point light sources 1 travels through an inner portion of the light guide plate 2. Then, the light is scattered to be deflected by the plurality of micro-structures for light-scattering, and outputted from the light exit surface. When a plurality of additional micro-structures for light-scattering are formed on the light exit surface of the light guide plate 2, the additional micro-structures for light-scattering have the job of directly outputting the light traveling through the inner portion of the light guide plate from the light exit surface (light irradiation surface), and further deflecting deflection light from the micro-structures for light-scattering which are formed on the rear surface to produce an excellent radiation angle distribution.

Light reflecting layers 3 and 4 are provided facing three side surfaces perpendicular to the light incident surface of the light guide plate 2 and the rear surface, that is, four surfaces of the light guide plate 2 excluding the light exit surface and the light incident surface. Disposed on each of the light reflecting layers 3 and 4 is a polymer film in which a layer containing Ag, Al, or a compound thereof is formed on a surface thereof by vacuum evaporation, or a polymer film mixed with white pigment to improve reflectance.

A light diffusing sheet 5 and a prism sheet 6 are provided facing the light exit surface of the light guide plate 2. The light diffusing sheet 5 is a transparent sheet having a micro-structure for light-scattering such as grain formed on a surface thereof, or a transparent sheet having bead particles applied onto the surface thereof. The light diffusing sheet 5 has a function of diffusing light outputted from the light guide plate 2 to uniform the light. By providing the light diffusing sheet 5, it is possible to reduce an adverse affect due to intensity unevenness, occurrence of bright line, or the like, produced to the light outputted from the light guide plate 2.

The prism sheet 6 is a transparent film in which a plurality of micro-prisms with edges being substantially parallel to the light incident surface are regularly formed on a surface thereof. The prism sheet is used to convert an output angle of light outputted from the light guide plate 2 into an angle corresponding to a direction perpendicular to the surface of the prism sheet, thereby improving a vision-independent intensity. While FIG. 1 shows the case where a single prism sheet is provided, two prism sheets with edges substantially orthogonal to each other may also be provided. Alternatively, the prism sheet 6 may be omitted depending on the output angle of the light outputted from the light guide plate 2.

The respective elements described above are supported and fixed by a case 8. Therefore, even if a mechanical force is applied to the case 8 from an outside, stable illumination can be performed without changing a positional relationship among the elements, thereby making handling easier. Note that, when the case 8 is made of a polymer material mixed with a high-reflectance material such as white pigment, the light reflecting layers 3 and 4 maybe omitted.

Figure 3:
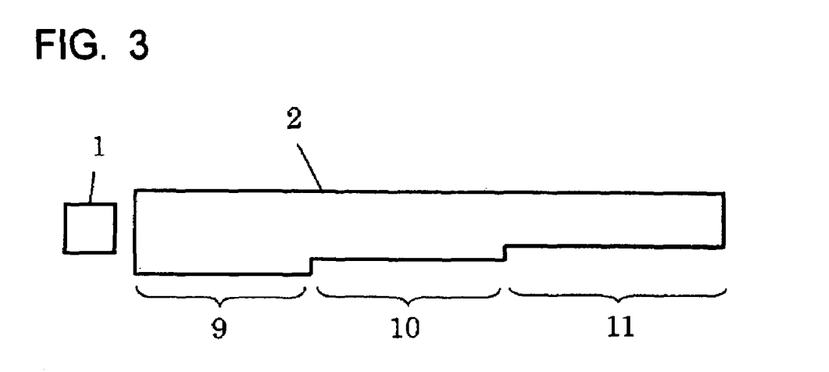
FIG. 3 is a schematic sectional view showing a light guide plate used for the lighting device according to the embodiment of the present invention.

The light guide plate 2 used for the lighting device according to this embodiment is divided into a plurality of regions. FIG. 2 shows an example in which the light guide plate 2 is divided into three regions 9, 10, and 11. The light guide plate 2 may be divided into four or more regions, depending on a size and a thickness of the light guide plate 2. FIG. 3 is a schematic view showing a state of the light guide plate 2 divided into three regions 9, 10, and 11. As shown in FIG. 3. The thickness of the light guide plate changes in the respective regions. That is, the light guide plate 2 becomes thinner as a distance from the point light source 1 increases.

In this embodiment, a boundary 12 between the regions 9 and 10 and a boundary 13 between the regions 10 and 11 as shown in FIG. 2 each have arc shapes substantially drawn about the point light sources 1a, 1b, and 1c. Strictly speaking, it is desirable that each of the boundaries 12 and 13 have an arc shape about a convergent point of spread of light entered from each of the point light sources in the inner portion of the light guide plate. When the boundary between the separated regions is formed in the arc shape, light reflected on the boundary surface travels to the center of the arc shape (that is, to the point light source side). Therefore, the light can be efficiently reflected to be utilized again on the micro-structures for light-scattering which are formed in the light guide plate. Although a shape of each of the boundaries 12 and 13 in a sectional direction is not particularly limited, it is desirable to perpendicularly tilt the shape or to tilt the shape such that an apex angle thereof is an obtuse angle. Thus, a bright line caused on the boundary surface can be reduced. It is preferable to set a step height of the boundary to about 20 µm to 100 µm. That is, it is preferable that a thickness of the light guide plate 2 be reduced by about 20 µm to 100 µm for each region. It is not preferable to set the step height to a value smaller than 20 µm, because it requires to increase the number of separate regions. It is also not preferable to set the step height to a value larger than 100 µm, because it increases an effect due to generation of the bright line.

The surface divided into the region may be the light exit surface or the surface opposed to the light exit surface. In the case where the light exit surface is divided into the regions, when the micro-structures for light-scattering are not formed on the light exit surface, the light guide plate is easy to produce but there is a fear that the bright line on the boundary between the regions is likely to be seen easily. This can be alleviated by widening a taper angle of the step forming the boundary between the regions, or optimizing a haze value of the light diffusing sheet. On the other hand, in the case where the surface opposed to the light exit surface is divided into the regions, the bright line is hard to see but there is a fear that a method of producing the micro-structures for light-scattering is likely to be complicated.

As described above, the thickness of the light guide plate is changed for each region such that the light guide plate becomes thinner as the distance from the point light source increases. Therefore, the number of reflection of light repeated in the inner portion of the light guide plate can be increased as the distance from the point light source increases. When the light travels through the light guide plate 2, an optical power density reduces with an increase in distance from the light source point. Here, in order to have uniform light to be outputted from the light exit surface of the light guide plate, it is necessary to increase a forming density of the micro-structures for light-scattering with an increase in distance from the point light source. Thus, when the light guide plate 2 is not divided into the above-mentioned regions, the forming density of the micro-structures for light-scattering which are formed on the rear surface of the light guide plate at a largest distance from the point light source becomes maximal.

The formed separate regions are sandwiched by surfaces parallel to the light exit surface. Therefore, even when the thickness is different for each region, an angle at which light traveling through the inner portion is incident on the light exit surface or the rear surface over the entire light guide plate is equal to that in the case where the light guide plate is not divided into the regions. Thus, design values related to sizes and angles of the micro-structures for light-scattering, except for the forming density, are equal to those in the case where the light guide plate is not divided into the regions.

However, when the light guide plate 2 is divided into the regions having different thickness as shown in FIGS. 2 and 3, the number of reflection of light repeated in the inner portion of each of the regions changes, so an optimum forming density of the micro-structure for light-scattering changes. On the other hand, in each of the regions, an optical power density becomes smaller as the distance from the point light source increases. Therefore, a density at which the micro-structure for light-scattering is formed across the boundary between the respective regions discontinuously changes between a region located on the point light source side and a more distant region. However, in each of the regions, it is necessary to increase the forming density of the micro-structure for light-scattering according to an increase in distance from the point light source.

Next, the shape of the micro-structure for light-scattering will be described. FIG. 4A is a schematic perspective plan view showing the micro-structure for light-scattering as viewed from the light emitting surface of the light guide plate. FIG. 4B shows a cross sectional shape along a dashed line CD shown in FIG. 4A, and FIG. 4C shows a cross sectional shape along a dashed line AB shown in FIG. 4A. The micro-structure for light-scattering formed on the rear surface of the light guide plate has a concave shape inwardly recessed on the light guide plate. The shape of the micro-structure for light-scattering has an orientation in a longitudinal direction. The micro-structure for light-scattering includes two oblique surfaces 14 and 15 that cross each other at an edge 16 and two side surfaces 17a and 17b substantially perpendicular to the rear surface of the light guide plate. Therefore, as shown in FIG. 4B, the cross section along the dashed line CD is a square or a rectangle. Here, an area of the oblique surface 14 located on the point light source side is larger than that of the oblique surface 15. The micro-structure for light scattering is formed such that the longitudinal direction thereof is substantially aligned with a direction in which a light beam from the point light source is made incident on the micro-structure for light-scattering. As shown in FIG. 4A, the oblique surface 14 is a front-side oblique or inclined surface that reflects light incident from the point light source 1 toward the light exit surface of the light guide plate 2. A base line 14a of the oblique surface 14 is disposed substantially orthogonal to the direction in which the light from the point light source 1 is incident on each of the micro-structures. When a plurality of point light sources are provided, the micro-structure for light-scattering is formed such that the longitudinal direction thereof is substantially aligned with a direction in which a light beam from a point light source closest to the micro-structure for light-scattering is made incident on the micro-structure for light-scattering. As described above, the micro-structure for light-scattering is formed such that the longitudinal direction thereof is substantially parallel to the direction in which the light beam from the point light source is made incident on the micro-structure for light-scattering. The side surfaces 17a and 17b of the microstructure for light-scattering are formed such that virtual planes produced by extending the side surfaces toward the point light source cross each other at the vicinity of the point light source. When a plurality of point light sources are provided, the side surfaces 17a and 17b of the micro-structure for light-scattering are formed such that the virtual planes produced by extending the side surfaces toward the point light source cross each other at the vicinity of a point light source closest to the micro-structure for light-scattering. When the micro-structure for light scattering is formed in such a shape, the light from the point light source can be reflected on the oblique surface 14 with highest efficiency, thereby maximizing an intensity.

Figure 5A:
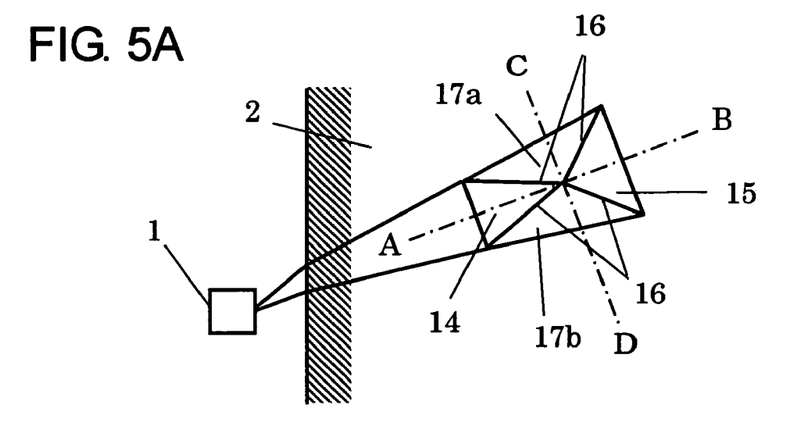
FIGS. 5A and 5B are schematic explanatory views showing another micro-structure for light-scattering formed in the light guide plate used in the embodiment of the present invention.
Figure 5B:
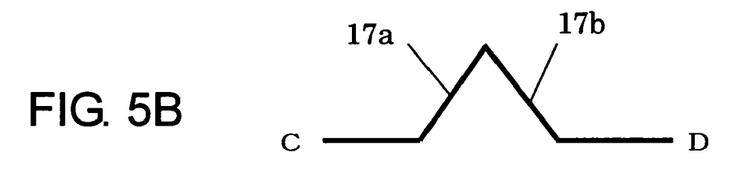

Another example of the shape of the micro-structure for light-scattering will be described. FIG. 5A is a schematic perspective plan view showing the micro-structure for light scattering as viewed from the light emitting surface of the light guide plate. FIG. 5B shows a cross sectional shape of the micro-structure for light-scattering along a dashed line CD shown in FIG. 5A. The micro-structure for light-scattering formed on the rear surface of the light guide plate has a concave shape inwardly recessed on the light guide plate. The shape of the micro-structure for light-scattering has an orientation in the longitudinal direction. The micro-structure for light-scattering includes the four surfaces 14, 15, 17a, and 17b that cross one another at the edge 16. In the above-mentioned example shown in FIG. 4A to 4C, the side surfaces 17a and 17b are substantially perpendicular to the rear surface of the light guide plate. In contrast to this, in the example shown in FIGS. 5A and 5B, the side surfaces 17a and 17b are oblique surfaces. Therefore, as shown in FIG. 5B, the cross section of the micro-structure for light-scattering is a rectangle. In the structure shown in FIG. 4A, an area of the oblique surfaces of the micro-structure for light-scattering facing the point light source is larger than that in the structure shown in FIG. 5A. Thus, the structure shown in FIG. 4A is preferable in order to reflect/deflect more parts of light from the point light source to the light exit surface of the light guide plate. When an arrangement density of the micro-structure for light-scattering is increased and the predetermined number of light beams traveling to the rear is ensured, the structure shown in FIG. 5A is preferable. In the structure shown in FIG. 5A, there is no edge in the apex portion of the micro-structure for light-scattering, so it is advantageous to suppress the generation of a bright line on the light exit surface of the light guide plate. The other structural portions of the micro-structure for light-scattering and an effect thereof are not different from those in the example shown in FIG. 4A.

Figure 6:
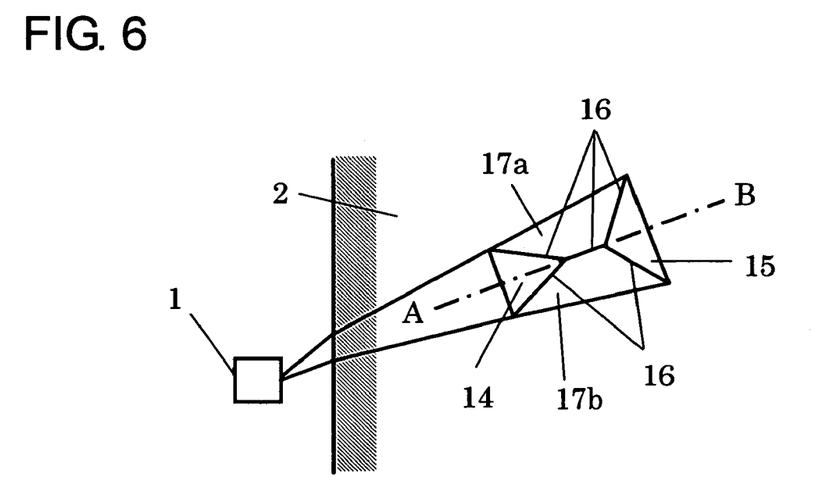
FIG. 6 is a schematic explanatory view showing another micro-structure for light-scattering formed in the light guide plate used in the embodiment of the present invention.

Another shape of the micro-structure for light-scattering will be described with reference to FIG. 6. FIG. 6 is a schematic view showing the micro-structure for light-scattering as viewed from the rear surface of the light guide plate. The micro-structure for light-scattering formed on the rear surface of the light guide plate has a concave shape inwardly recessed on the light guide plate. The shape of the micro-structure for light-scattering has an orientation in the longitudinal direction. The micro-structure for light-scattering includes the four surfaces 14, 15, 17a, and 17b that cross one another at the edge 16. A point different from the example shown in FIG. 5A is that a single edge is formed by the side surfaces 17a and 17b. Therefore, a cross sectional shape of the micro-structure for light-scattering defined by a straight line joining the micro-structure for light-scattering with the point light source is a trapezoid or a quadrangle. Here, the side surfaces 17a and 17b are roughed to diffuse and reflect light beams which are made incident on the side surfaces. In order to significantly improve a diffusion effect, the area of the side surfaces 17a and 17b is made larger than that in the structure shown in FIG. 5A. Thus, the amount of diffusion light on the light exit surface of the light guide plate is increased to suppress the generation of the bright line or moire, eliminating the need for a diffusion plate conventionally provided on the light exit surface of the light guide plate.

Figure 7:
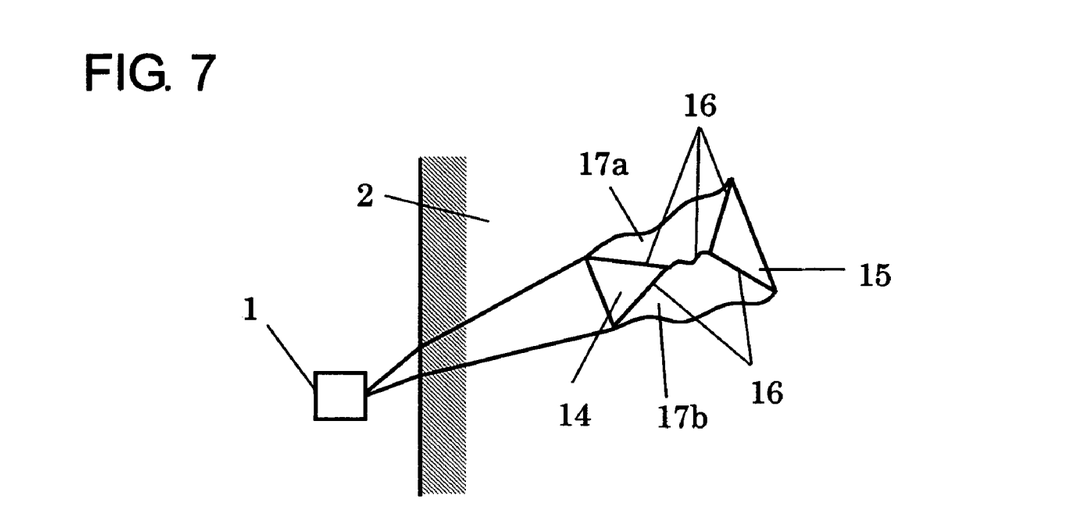
FIG. 7 is a schematic explanatory view showing another micro-structure for light-scattering formed in the light guide plate used in the embodiment of the present invention.

Another shape of the micro-structure for light-scattering will be described with reference to FIG. 7. FIG. 7 is a schematic view showing the micro-structure for light-scattering as viewed from the rear surface of the light guide plate. The micro-structure for light-scattering formed on the rear surface of the light guide plate has a concave shape inwardly recessed on the light guide plate. The shape of the micro-structure for light-scattering has an orientation in the longitudinal direction. The micro-structure for light-scattering includes the four surfaces 14, 15, 17a, and 17b that cross one another at the edge 16. The structure is similar to that shown in FIG. 6 in that a single edge is formed by the side surfaces 17a and 17b. However, here, the edge takes the form of an S-shape, a regular curve shape, an irregular curve shape, or a zigzag shape. According to such shapes, a light diffusion area of the side surfaces 17a and 17b increases as compared with that in the structure shown in FIG. 6, and diffusion directions of light beams reflected on the side surfaces can be controlled. Therefore, it is possible to suppress the generation of the bright line or moire on the light exit surface of the light guide plate.

Figure 8:
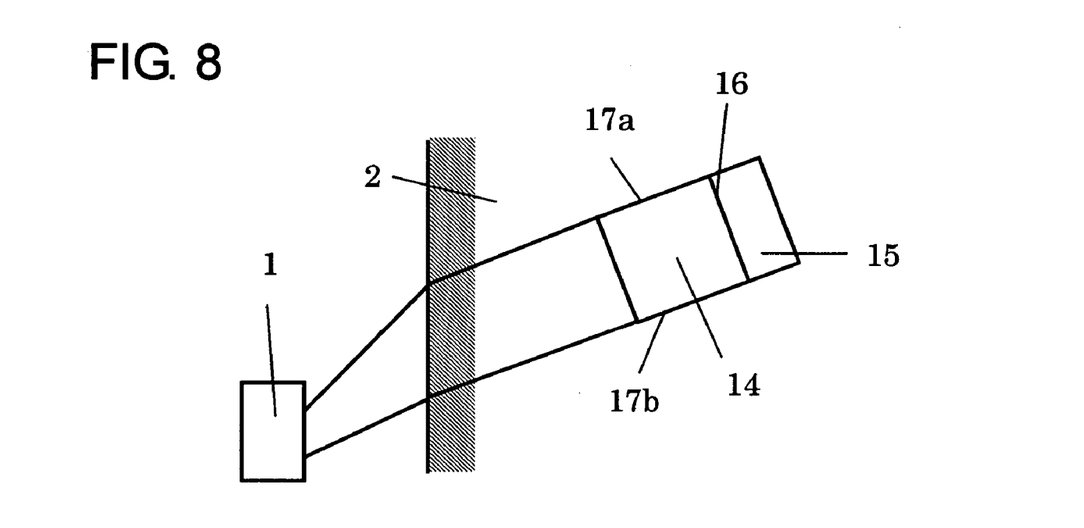
FIG. 8 is a schematic explanatory view showing another micro-structure for light-scattering formed in the light guide plate used in the embodiment of the present invention.

Another shape of the micro-structure for light-scattering will be described with reference to FIG. 8. FIG. 8 is a schematic view showing the micro-structure for light-scattering as viewed from the rear surface of the light guide plate. The micro-structure for light-scattering formed on the rear surface of the light guide plate has a concave shape inwardly recessed on the light guide plate. The shape of the micro-structure for light-scattering has an orientation in the longitudinal direction. The micro-structure for light-scattering includes the two oblique surfaces 14 and 15 that cross each other at the edge 16, and the two side surfaces 17a and 17b substantially perpendicular to the rear surface of the light guide plate. In the example shown in FIG. 8, the oblique surface 14 located on the point light source side is larger than that of the oblique surface 15. The micro-structure for light-scattering is formed such that the longitudinal direction thereof is substantially aligned with a direction in which a light beam from the vicinity of the point light source is made incident on the micro-structure for light-scattering. Therefore, in the case of a single LED chip including a plurality of point light sources, such as a 2-in-1 chip, light from the plurality of point light sources can be efficiently reflected on the oblique surface 14, thereby maximizing an intensity.

Cross sectional shapes of the micro-structure for light-scattering in the longitudinal direction will be described in detail with reference to the drawings. FIG. 9 is a schematic view showing a cross sectional shape of the light guide plate along a line corresponding to the dashed line AB shown in FIG. 4A or FIG. 5A. In the example shown in FIG. 9, the cross section of the micro-structure for light-scattering 18 in a direction where the micro-structure for light-scattering 18 is joined with a closest point light source 1 of the plurality of point light sources is substantially a right triangle. That is, the oblique surface 15 shown in FIG. 4A or 5A is substantially perpendicular to the rear surface of the light guide plate 2. An angle defined by the oblique surface 14 and the rear surface of the light guide plate 2 depends on a thickness of the light guide plate, a length thereof, a light output angle on the light exit surface, or the like, falling within a range of 5 degrees to 55 degrees. When the angle is small to range from about 5 degrees to 15 degrees, light traveling within the light guide plate can be reflected under a total reflection condition or a condition close thereto, so light output efficiency increases. However, a light output angle is significantly tilted relative to a normal on the light exit surface of the light guide plate, so a visual characteristic deteriorates. In such a case, it is necessary to correct the light output angle by the prism sheet 6 shown in FIG. 1. When the angle is large to range from 45 degrees to 55 degrees, the light traveling within the light guide plate is reflected under a condition different from the total reflection condition, so the light output efficiency decreases. However, the light output angle is an angle of 0±15 degrees relative to the normal on the light exit surface of the light guide plate, so light is reflected in a visual direction (normal direction on the light exit surface), thereby eliminating the need for the prism sheet 6.

Figure 10:
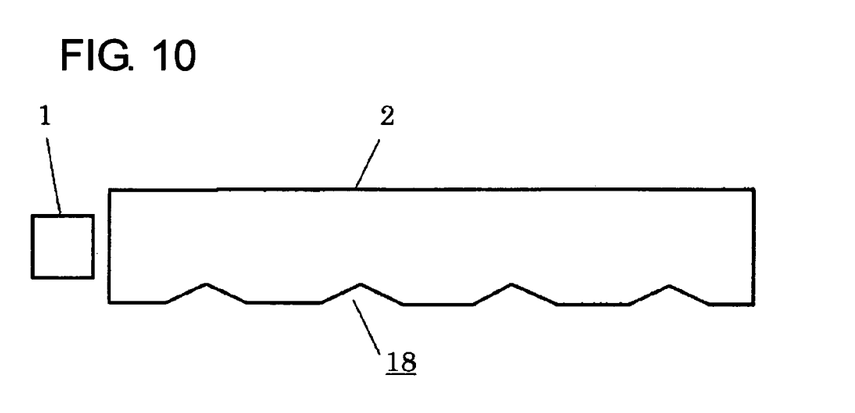
FIG. 10 is a schematic view showing a cross sectional shape of another light guide plate used for the lighting device according to the embodiment of the present invention.

Similarly, another cross sectional shape of the micro-structure for light-scattering in the longitudinal direction will be described with reference to FIG. 10. In the example shown in FIG. 10, the cross section of the micro-structure for light-scattering 18 is an isosceles triangle. When the cross section is defined to be the isosceles triangle, efficiency is improved in which return light from an end surface opposed to the light incident surface on which the point light source 1 is located, or reflection light on the boundary surface between the separated regions travels to the light exit surface.

As regards to a typical size of the micro-structures for light-scattering shown in FIGS. 4 to 10, lengths of two sides of a bottom surface are (5 μm to 50 μm)×(7 μm to 120 μm) and a height is 5 μm to 120 μm. The size is changed according to the cross sectional shape, a tilt angle of the oblique surface, or the like. In order to obtain a maximal density, a short side size of the bottom surface is set to a small value such as about 5 μm.

Figure 12:
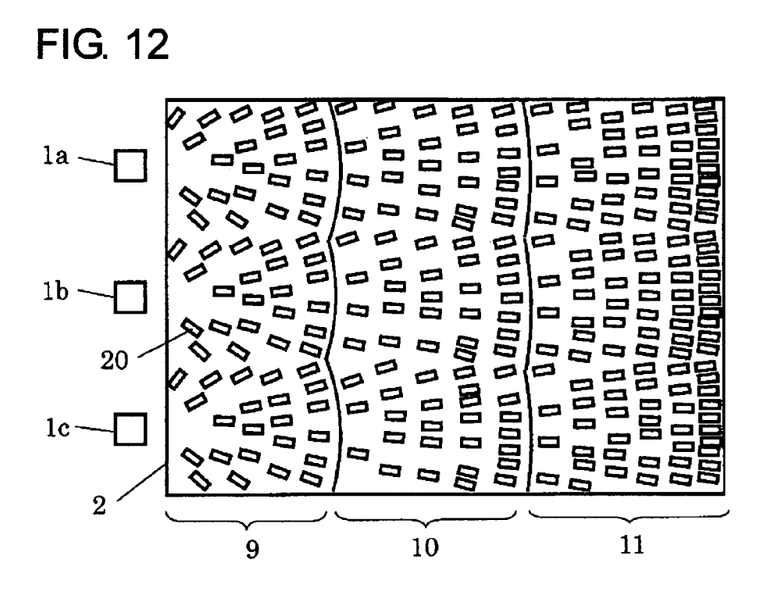
FIG. 12 is a schematic plan view showing an arrangement of micro-structures for light-scattering for the lighting device according to the embodiment of the present invention.

FIG. 12 is a schematic view showing a specific example of an arrangement of the micro-structures for light-scattering. As shown in FIG. 12, three LEDs 1a, 1b, and 1c are used as the point light sources. Micro-structures for light-scattering 20 are arranged such that the longitudinal direction of each of the shapes thereof is substantially parallel to a straight line joining each of the micro-structures for light-scattering with an LED located at the closest distance. The light guide plate 2 is divided into the three regions 9, 10, and 11. The forming density of the micro-structures for light-scattering 20 increases in each of the regions as the distance from the LED increases. Further, the forming density of the micro-structures for light-scattering 20 in the region 9 discontinuously reduces to be the forming density in the region 10. A reduction amount of the forming density is determined by a thickness difference of the light guide plate between the respective regions.

The micro-structures for light-scattering 20 are arranged parallel to a straight line joining each of the micro-structures for light-scattering with the LED in the longitudinal direction, so it is possible to increase a filling density in a forming direction of an arc about the vicinity of the LED. As a result, a scattering characteristic is hard to be saturated. A thickness of the light guide plate reduces with an increase in distance from the LED, so the number of reflection of light repeated in the inner portion becomes larger with an increase in distance from the LED. Therefore, a density of micro-structures for light-scattering which are formed in a region located at a distance from the LED can be set to a value smaller than a density obtained when the regions 9, 10, and 11 are not formed. When the regularity of the arrangement of the micro-structures for light-scattering is minimized, the generation of moire fringes or the like can be suppressed.

Figure 11:
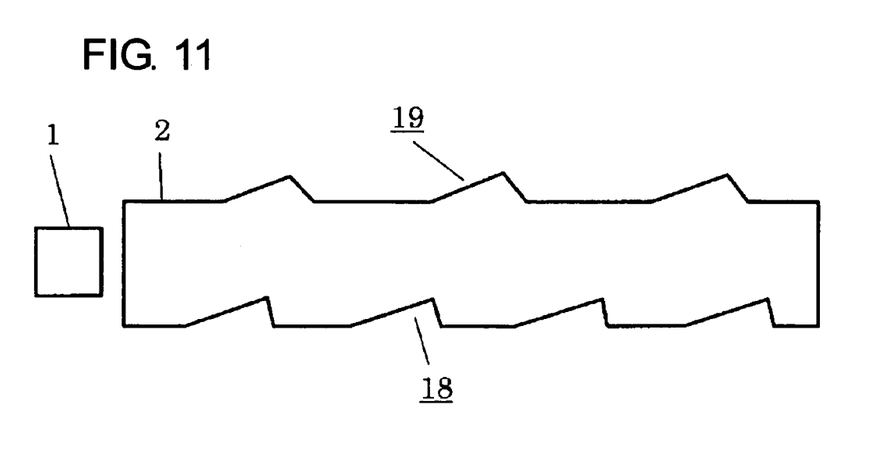
FIG. 11 is a schematic view showing a cross sectional shape of another light guide plate used for the lighting device according to the embodiment of the present invention.

As shown in FIG. 11, a second micro-structure for light-scattering 19 can be also provided on the light exit surface of the light guide plate 2 in addition to the micro-structure for light-scattering 18 provided on the rear surface of the light guide plate 2. The second micro-structure for light-scattering 19 has a function for scattering a traveling light component which cannot be fully scattered by the micro-structure for light-scattering 18 formed on the rear surface to exit the traveling light component from the light exit surface. A plan shape of the second micro-structure for light-scattering 19 is identical to that shown in FIG. 4A, and a side surface thereof is formed parallel to a straight line joining a closest point light source with the second micro-structure for light-scattering 19. Note that the second micro-structure for light-scattering 19 formed on the light exit surface needs to be uniformly produced at about ⅕ to ¹⁄₅₀ of the forming density of the micro-structure for light-scattering 18 formed on the rear surface to produce an effect. Therefore, the second micro-structure for light-scattering may be located such that the longitudinal direction is perpendicular to a direction joining the second micro-structure for light-scattering with the point light source. A cross sectional shape of the second micro-structure for light-scattering 19 as shown in FIG. 11 is convex to the outside of the light guide plate 2 to be shaped as a triangle. The shape of the triangle depends on a design value of the light output angle relative to the light exit surface. When the second micro-structure for light-scattering 19 is made convex to the inside of the light guide plate, a traveling direction of light reflected on the second micro-structure for light-scattering 19 is changed to a direction corresponding to the rear surface side of the light guide plate. Then, the light is reflected on the rear surface of the light guide plate or the light reflecting layer provided on the rear surface, and outputted from the light exit surface.

Figure 13:
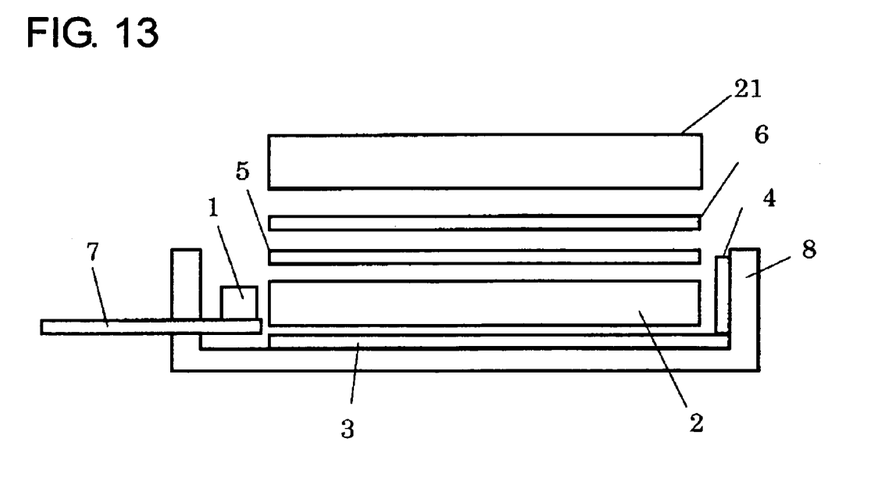
FIG. 13 is a schematic sectional view showing a liquid crystal display device according to the embodiment of the present invention.

Finally, a liquid crystal display device using the lighting device according to the embodiment of the present invention will be described with reference to FIG. 13. The lighting device includes the light guide plate 2 having any one of the abovementioned structures. The point light source 1 is provided facing the light incident surface of the light guide plate 2. The point light source 1 is mounted on an FPC board 7. The light reflecting layers 3 and 4 are provided facing three side surfaces of the light guide plate 2 and the rear surface thereof, that is, the four surfaces of the light guide plate 2 excluding the light exit surface and the light incident surface. A non-self illuminating or light emission element, such as a liquid crystal display element 21, is provided above the light exit surface of the light guide plate. The light diffusing sheet 5 and the prism sheet 6 are provided between the light guide plate 2 and the liquid crystal display element 21. An active matrix liquid crystal display element of transmission type using TFT elements, a passive matrix liquid crystal display element of transmission type using STN liquid crystal, or the like can be used as the liquid crystal display element. The liquid crystal display element 21 is commonly held by the case 8 holding the lighting device. The liquid crystal display element is connected with a circuit board (not shown), and power and drive signals are supplied thereto from a liquid crystal drive circuit. When the liquid crystal display device shown in FIG. 12 is produced, it is possible to realize a liquid crystal display device, which has a uniform intensity and brightness.

Thus, according to the present invention, it is possible to realize the lighting device using the point light source such as the LED with reduced thickness and weight, and it is also possible to realize a lighting device which has high light use efficiency, a high intensity, and low power consumption, and a display device using the lighting device.

What is claimed is:
1. A lighting device, comprising:
a point light source for emitting light;
a light guide plate having a light incident surface on which light from the point light source is incident and a light exit surface, the light guide plate guiding light from the point light source that is incident on the light incident surface to the light exit surface; and
a plurality of micro-structures inwardly recessed in a surface of the light guide plate that is opposite to the light exit surface for scattering light from the point light source that is incident on the light incident surface, a longitudinal direction of each of the micro-structures being substantially aligned with a direction in which the light from the point light source is incident on each of the micro-structures, and each of the micro-structures having a concave shape and an inclined surface for reflecting the incident light toward the light exit surface of the light guide plate, a base line of the inclined surface of each micro-structure being disposed substantially orthogonal to the direction in which the light from the point light source is incident on each of the micro-structures.

2. A lighting device according to claim 1; wherein the longitudinal direction of each of the micro-structures is substantially parallel to a straight line joining each of the micro-structures with the point light source.

3. A lighting device according to claim 1; wherein two side surfaces of each of the micro-structures are oriented so that virtual planes produced by extending the two side surfaces toward the point light source cross each other at the point light source.

4. A lighting device according to claim 3; wherein each of the two side surfaces of each of the micro-structures comprises a light diffusing surface.

5. A lighting device according to claim 3; wherein each of the two side surfaces of each of the micro-structures comprises one of a wave-curved surface and a plurality of surfaces.

6. A lighting device according to claim 1; wherein a cross-sectional shape of each of the micro-structures along a straight line joining each of the micro-structures with the point light source comprises a right triangle.

7. A lighting device according to claim 1; wherein a cross-sectional shape of each of the micro-structures along a straight line joining each of the micro-structures with the point light source comprises an isosceles triangle.

8. A lighting device according to claim 1; wherein a cross-sectional shape of each of the micro-structures along a straight line joining each of the micro-structures with the point light source comprises a trapezoid.

9. A lighting device according to claim 1; wherein the micro-structures comprise first micro-structures; and further comprising a plurality of second micro-structures formed separate from one another on the light exit surface of the light guide plate for scattering light from the point light source, a longitudinal direction of each of the second micro-structures being one of substantially parallel to and perpendicular to a straight line joining each of the second micro-structures with the point light source.

10. A lighting device according to claim 1; wherein the point light source comprises a plurality of point light sources and the micro-structures are disposed so as to correspond to the respective point light sources.

11. A lighting device according to claim 1; wherein one of the light exit surface of the light guide plate and the surface opposed to the light exit surface are divided into a plurality of regions and a thickness of the light guide plate in each of the plurality of regions decreases with an increase in distance from the point light source.

12. A lighting device according to claim 11; wherein the regions are separated from one another such that each of the regions is substantially orthogonal to a straight line joining each of the micro-structures with the point light source.

13. A lighting device according to claim 11; wherein a boundary surface between the regions has an arc shape about the point light source as a substantial center.

14. A lighting device according to claim 11; wherein a forming density of the micro-structures discontinuously varies through a boundary surface between the plurality of regions.

15. A display device, comprising:
a point light source for emitting light;
a light guide plate having a light incident surface on which light from the point light source is incident and a light exit surface, the light guide plate guiding light from the point light source that is incident on the light incident surface to the light exit surface;
a non-self light emission display element disposed over the light exit surface of the light guide plate; and
a plurality of micro-structures inwardly recessed in a surface of the light guide plate that is opposite to the light exit surface for scattering light from the point light source that is incident on the light incident surface, a longitudinal direction of each of the micro-structures being substantially aligned with a direction in which the light from the point light source is incident on each of the micro-structures, and each of the micro-structures having a concave shape and an inclined surface for reflecting the incident light toward the light exit surface of the light guide plate, a base line of the inclined surface of each micro-structure being disposed substantially orthogonal with the direction in which the light from the point light source is incident on each of the micro-structures.

16. A lighting device comprising:
a light guide plate having a light incident surface and a light exit surface;
at least one point light source for emitting light that is incident on the light incident surface of the light guide plate and is guided by the light guide plate to the light exit surface of the light guide plate; and
a plurality of micro-structures disposed on a surface of the light guide plate that is opposite to the light exit surface thereof for scattering light from the point light source that is incident on the light incident surface, a longitudinal direction of each of the micro-structures being substantially aligned with a direction in which the light from the point light source is incident on each of the micro-structures, and each of the micro-structures having an inclined surface for reflecting the incident light toward the light exit surface of the light guide plate, a base line of the inclined surface of each micro-structure being disposed substantially orthogonal with the direction in which the light from the point light source is incident on each of the micro-structures.

17. A lighting device according to claim 16; wherein a cross-sectional shape of each of the micro-structures along a straight line joining each of the micro-structures with the point light source comprises a right triangle.

18. A lighting device according to claim 16; wherein a cross-sectional shape of each of the micro-structures along a straight line joining each of the micro-structures with the point light source comprises an isosceles triangle.

19. A lighting device according to claim 16; wherein a cross-sectional shape of each of the micro-structures along a straight line joining each of the micro-structures with the point light source comprises a trapezoid.

20. A lighting device according to claim 16; wherein the at least one point light source comprises a plurality of point light sources.

* * * * *